(12) United States Patent
Smith et al.

(10) Patent No.: US 11,040,787 B2
(45) Date of Patent: Jun. 22, 2021

(54) DOSING ASSEMBLY FOR USE WITH A FILLER, A VALVE FOR A DOSING ASSEMBLY AND A METHOD OF PROVIDING A FILL MATERIAL

(71) Applicant: HyVida Brands, Inc., Northridge, CA (US)

(72) Inventors: Rick Smith, Northridge, CA (US); Lon Kloosterman, Zeeland, MI (US); Jeffrey Persenaire, Hudsonville, MI (US)

(73) Assignee: HyVida Brands, Inc., Muskegon, MI (US)

( * ) Notice: Subject to any disclaimer, the term of this patent is extended or adjusted under 35 U.S.C. 154(b) by 31 days.

(21) Appl. No.: 16/363,425

(22) Filed: Mar. 25, 2019

(65) Prior Publication Data

US 2019/0300209 A1 Oct. 3, 2019

Related U.S. Application Data

(60) Provisional application No. 62/648,509, filed on Mar. 27, 2018.

(51) Int. Cl.
| | | |
|---|---|---|
| *B65B 3/30* | (2006.01) | |
| *B65B 37/20* | (2006.01) | |
| *B65B 39/00* | (2006.01) | |
| *B65B 3/14* | (2006.01) | |
| *G01F 11/14* | (2006.01) | |
| *B67C 3/20* | (2006.01) | |

(52) U.S. Cl.
CPC .................. *B65B 3/30* (2013.01); *B65B 3/14* (2013.01); *B65B 37/20* (2013.01); *B65B 39/005* (2013.01); *G01F 11/14* (2013.01); *B67C 3/204* (2013.01)

(58) Field of Classification Search
CPC .... B65B 3/30; B65B 3/14; B65B 3/26; B65B 3/04; B65B 39/001; B65B 39/004; B65B 39/005; B65B 37/20; B67C 3/204; G01F 11/12; G01F 11/14
See application file for complete search history.

(56) References Cited

U.S. PATENT DOCUMENTS

| | | | | |
|---|---|---|---|---|
| 3,179,134 A | * | 4/1965 | Sigrist | B29C 44/445 141/67 |
| 3,565,297 A | * | 2/1971 | Bladt | B30B 11/025 222/263 |
| 3,667,653 A | * | 6/1972 | Loewenthal | B65B 3/26 222/217 |

(Continued)

FOREIGN PATENT DOCUMENTS

| | | |
|---|---|---|
| RU | 2485450 C1 | 6/2013 |
| SU | 406127 A1 | 11/1973 |

(Continued)

*Primary Examiner* — Nicolas A Arnett

(74) *Attorney, Agent, or Firm* — The Watson IP Group, PLC; Jovan N. Jovanovic

(57) ABSTRACT

A dosing assembly for a filler including a valve assembly, a product hopper, a containment system and an attachment bracket. The dosing assembly can be coupled to a filler (for example, after filling, and prior to closing, capping or covering a container) for dispensing a dose of a fill material into the container. The fill material may comprise any number of different granular materials, including, but not limited to magnesium particles.

14 Claims, 9 Drawing Sheets

(56) References Cited

U.S. PATENT DOCUMENTS

| | | | | |
|---|---|---|---|---|
| 3,943,601 A * | 3/1976 | Kuhlman | ............... | A22C 7/00 |
| | | | | 425/441 |
| 5,095,959 A * | 3/1992 | Komassa | ............ | B65D 90/587 |
| | | | | 141/10 |
| 5,309,955 A * | 5/1994 | Torterotot | ............... | B65B 3/32 |
| | | | | 141/1 |
| 6,293,316 B1 * | 9/2001 | Bertolotti | ............... | B65B 1/06 |
| | | | | 141/20 |
| 9,079,726 B2 * | 7/2015 | Brimson | ............. | B65G 69/181 |
| 9,820,615 B2 * | 11/2017 | Jin | ........................ | B65B 1/36 |
| 2009/0001101 A1 * | 1/2009 | Zahradka | ............ | B65B 39/005 |
| | | | | 222/228 |
| 2016/0302468 A1 * | 10/2016 | Robinson | ............... | A23P 30/32 |
| 2018/0155069 A1 * | 6/2018 | Thrane | .................. | B65B 39/14 |
| 2018/0185242 A1 * | 7/2018 | Kikuchi | ................. | B65B 39/00 |

FOREIGN PATENT DOCUMENTS

| | | | |
|---|---|---|---|
| SU | 891540 | A1 | 12/1981 |
| SU | 1434264 | A1 | 10/1988 |

\* cited by examiner

DOSING ASSEMBLY FOR USE WITH A FILLER, A VALVE FOR A DOSING ASSEMBLY AND A METHOD OF PROVIDING A FILL MATERIAL

CROSS-REFERENCE TO RELATED APPLICATION

This application claims priority from U.S. Pat. App. Ser. No. 62/648,509 filed Mar. 27, 2019, entitled "Dosing Assembly For Use With A Filler", the entire disclosure of which is hereby incorporated by reference in its entirety.

BACKGROUND OF THE DISCLOSURE

1. Field of the Disclosure

The disclosure relates in general to container filling, and more particularly, to a dosing assembly for use with a filler, a filler with a dosing assembly and associated methods of supplying a dose of a fill material to a container, preferably during the filling process thereof.

2. Background Art

The filling process is well known in the art. Typically, containers (rigid, flexible, metal, polymer) can be filled at high speeds on filling equipment. Such equipment typically fills the container and then applies a closure to the container (a double seam top, a screw-on or snap on cap, etc.). Such equipment operates at levels of from several containers per minute to thousands of containers per minute.

While such equipment is well suited for the filling of, for example, beverages and the like, that are flowable and liquid, it has been problematic to add fill material (as defined below) into the process (either before, during or after filling). Typically, any fill type material is provided to the flowable material (typically a liquid) prior to filling. This can lead to problems with cleaning and can negatively impact the durability of the equipment. Other solutions are difficult to implement and require redesigning of equipment.

It would be advantageous to provide fill material to containers in the filling process during the filling process (before, during or after). It would further be advantageous to provide dosing assemblies to a filler without requiring changes to the fill equipment, or to require extensive modifications to systems or to equipment.

SUMMARY OF THE DISCLOSURE

The disclosure is directed to a dosing assembly for use with a filler. The dosing assembly includes a valve assembly. The valve assembly includes a valve body and a valve slider plate. The valve body has an inlet and an outlet, and a transverse slot in communication with the inlet and the outlet. The valve slider plate is positionable in the transverse slot, and has a transfer dose cavity. The transfer dose cavity is placeable in communication with the inlet and the outlet of the valve body, upon selective slidable movement of the valve slider plate.

In some configurations, the slider plate is structurally configured to move between a first slidable position and a second slidable position. In the first slidable position, the transfer dose cavity is in communication with the inlet of the valve body. In the second position, the transfer dose cavity is in communication with the outlet of the valve body.

In some configurations, the valve assembly further includes a pneumatic passage in fluid communication with the transfer dose cavity when the transfer dose cavity is in the second position.

In some configurations, the slider plate further includes a second opening. The second opening is in fluid communication with the pneumatic passage and the outlet when the transfer dose cavity is in the first position.

In some configurations, the second opening comprises an elongated slot.

In some configurations, the inlet defines an inlet axis and the outlet defines an outlet axis. The inlet axis and the outlet axis are substantially parallel to each other. The valve slider plate is movable between the first position and the second position along a path substantially perpendicular to each of the inlet axis and the outlet axis.

In some configurations, the valve assembly further comprises an actuator attachable to the valve slider plate, structurally configured to move the slider plate between a first slidable position and a second slidable position.

In some configurations, the inlet further comprises a funnel defining a substantially conical portion.

In some configurations, the length of the outlet includes an elongated dispensing tube that has a length that is multiples of a thickness of the valve slider plate.

In some configurations, the inlet, the outlet and the transfer dose cavity each define a cross-sectional configuration, with the cross-sectional configuration of each substantially matching.

In some configurations, the valve slider plate has a substantially rectangular configuration, substantially matching the transverse slot.

In another aspect of the disclosure, the disclosure is directed to a dosing assembly for use with a filler. The dosing assembly comprises a valve assembly and a product hopper having a cavity placeable into fluid communication with the inlet of the valve assembly.

In some configurations, the product hopper further includes at least one frustoconical member extending from the inlet. Each of the at least one frustoconical members being attachable in an end to end configuration.

In some configurations, the product hopper further includes a pneumatic supply opening structurally configured to provide a pneumatic supply to the cavity of the product hopper.

In some configurations, the dosing assembly further includes a containment system defining a containment cavity, with the valve assembly positionable therein.

In some configurations, the containment system further includes a pneumatic opening structurally configured to provide a pneumatic supply to the containment cavity.

In another aspect of the disclosure, the disclosure is directed to a filler comprising a dosing assembly and a conveyor. The dosing assembly includes a valve assembly and a product hopper having a cavity placeable into fluid communication with the inlet of the valve assembly. The conveyor is operably configured to carry a container thereon positioned to traverse an opening of the container below the outlet of the valve assembly.

In yet another aspect of the disclosure, the disclosure is directed to a method of providing fill material to a container in a filler, the method comprising the steps of: providing the valve assembly; a valve slider plate positionable in the transverse slot, and having a transfer dose cavity, the transfer dose cavity placeable in communication with the inlet and the outlet of the valve body, upon selective slidable movement of the valve slider plate; first directing a fill material into the inlet; second directing the fill material from the inlet into the transfer dose cavity, the valve slider plate being positioned in a first position wherein the inlet is in fluid communication with the transfer dose cavity; slidably moving the valve transfer plate toward and into the second position wherein the outlet is in fluid communication with the transfer dose cavity; third directing the fill material from the transfer dose cavity through the outlet; positioning a container so as to have a cavity thereof in communication with the outlet; and fourth directing the fill material into the cavity of the container.

In some configurations, the steps of at least one of the first, second, third and fourth directing of the fill material occur due to gravity.

In some configurations, the step of third directing further comprises the step of directing a pneumatic force at the transfer dose cavity when the valve slider plate is in the second position.

It is contemplated that the fill material may comprise magnesium metal particles, shavings, or the like.

BRIEF DESCRIPTION OF THE DRAWINGS

The disclosure will now be described with reference to the drawings wherein.

DETAILED DESCRIPTION OF THE DISCLOSURE

Figure 1:
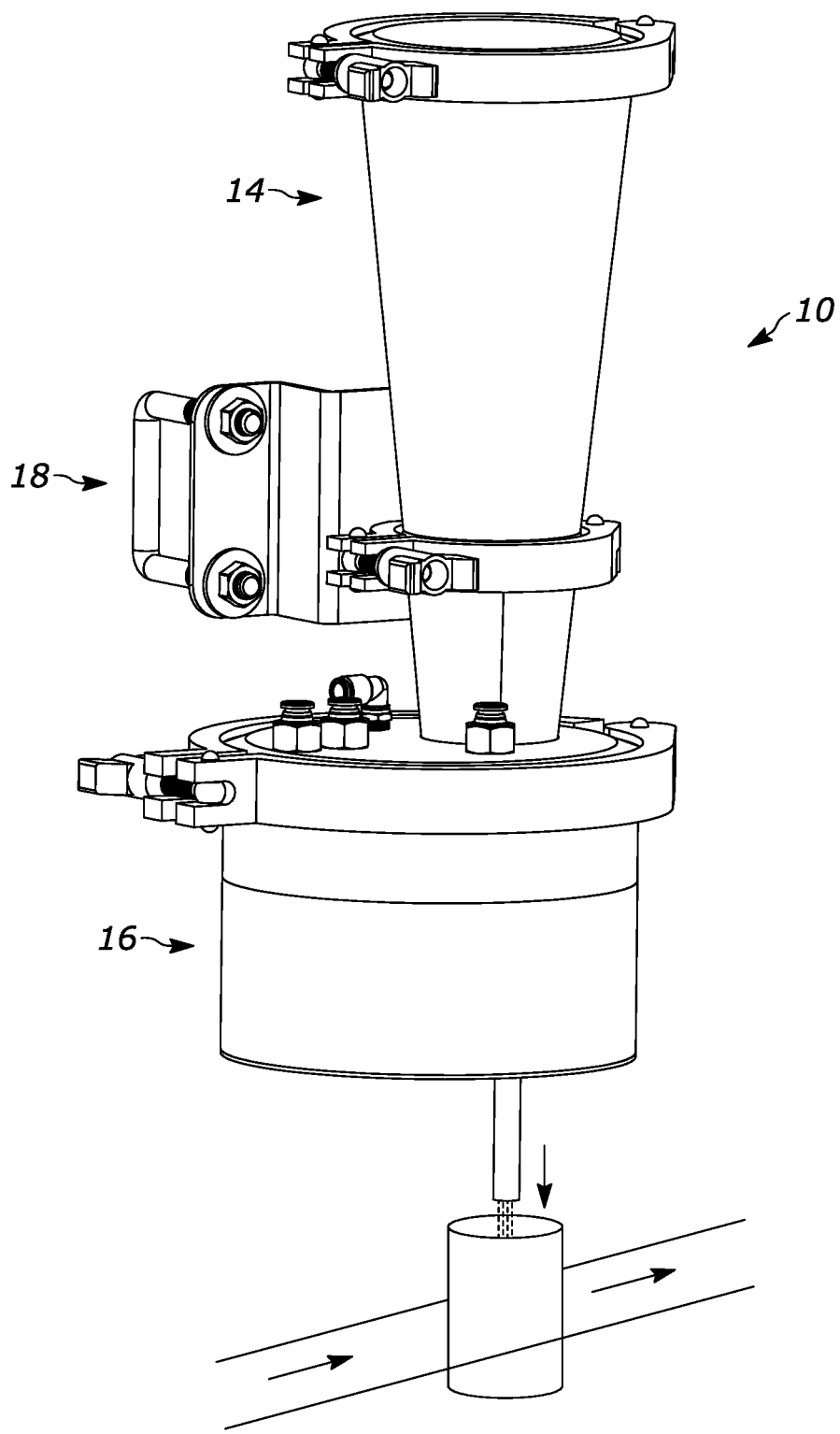
FIG. 1 of the drawings is a perspective view of a dosing assembly of the present disclosure, configured for use with a filler, and shown directing a fill material into a container, which container may be prefilled with a liquid, such as a beverage, or another flowable material (or this may occur prior to filling)

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
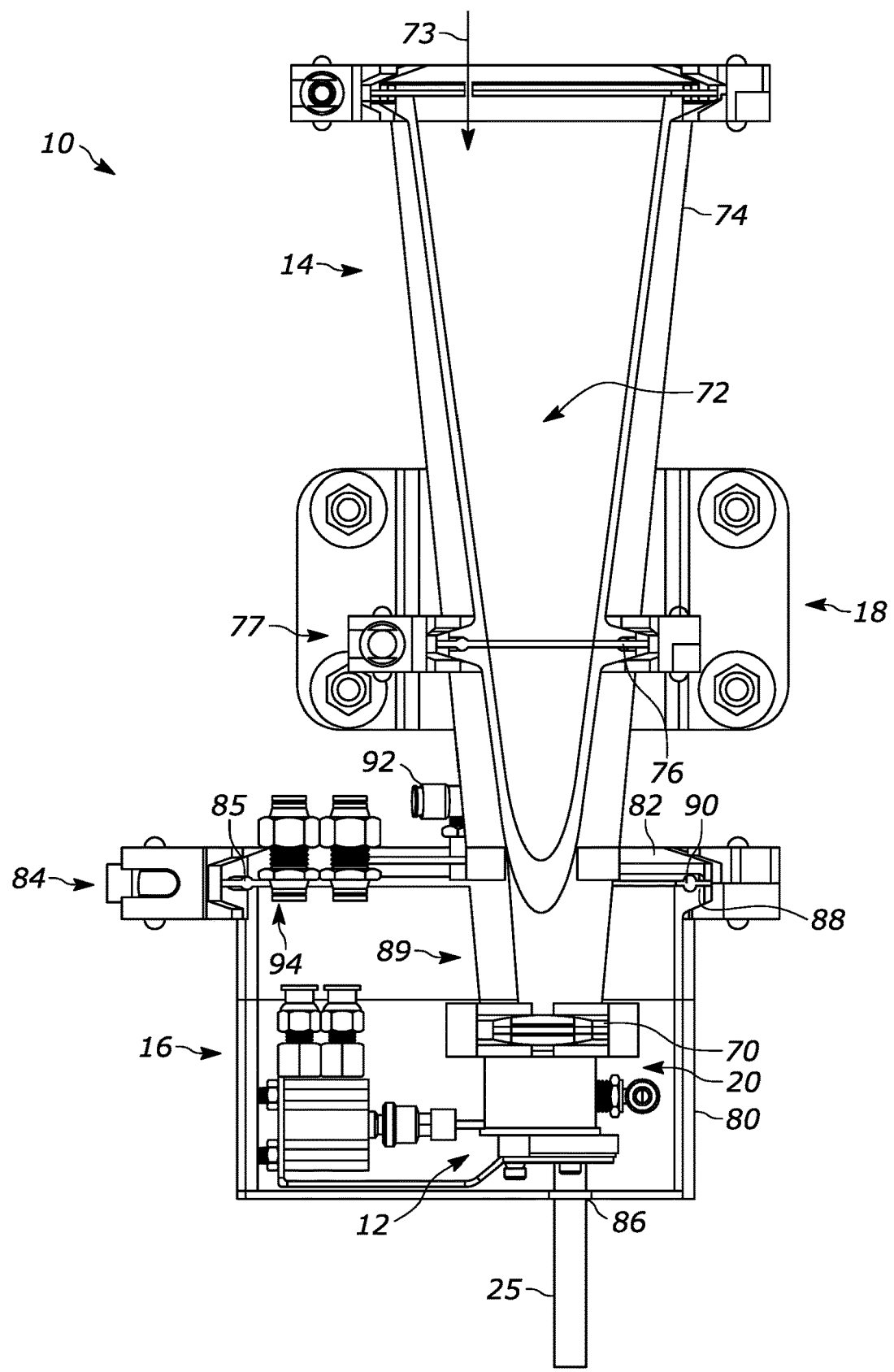
FIG. 2 of the drawings is a cross-sectional view of the dosing assembly of the present disclosure.

Referring now to the drawings and in particular to FIG. 1 and FIG. 2, the dosing assembly for use with a filler is shown generally at 10. It will be understood that the dosing assembly is configured for use with a filler of the type that fills containers, such as cans, for example, and not to be deemed limiting, beverage cans that are metal and the like. Additionally, the dosing assembly is likewise configured for use in association with a filler that fills polymer based rigid containers, such as those that are typically used for beverages, that have a snap on or twist spout. Further still, the dosing assembly is likewise suitable for use in association with a filler that fills polymer based flexible containers, such as those types of containers that utilize a rigid spout coupled to a flexible body, such as those having metallic liners which can retain the presence of gasses within the container (i.e., carbonation or hydrogen, etc.) while not being limited thereto.

It is contemplated that the dosing assembly is utilized with various different types of fill material that is to be inserted into the containers. Generally, the fill material comprises a flowable granular material, such as, for example, and without limitation, metal shavings (i.e., Mg, among others), mineral elements, compositions, or materials, color based agents, flavorings, sweeteners, encapsulated materials, particulates (i.e., glitter, etc.), flakes (i.e., gold or other flakes, etc.), polymers, caffeine carriers, capsules, time release capsules, additives, among other materials. It is contemplated that any such materials that can flow through the valve assembly are contemplated for use.

With continued reference to FIGS. 1 and 2, the dosing assembly 10 is shown as including valve assembly 12, product hopper 14, containment system 16 and attachment bracket 18. It will be understood that the dosing assembly may be attached to a movable stand or frame structure and may be positioned in the process of filling after the product has been filled into the container, or prior thereto (in other configurations). It will be understood that the attachment may be achieved through the use of attachment bracket 18. There is no particular limitation as to how and where the dosing assembly is coupled to a filler. Additionally, it is contemplated that multiple dosing assemblies can be coupled to a single filler.

Figure 3:
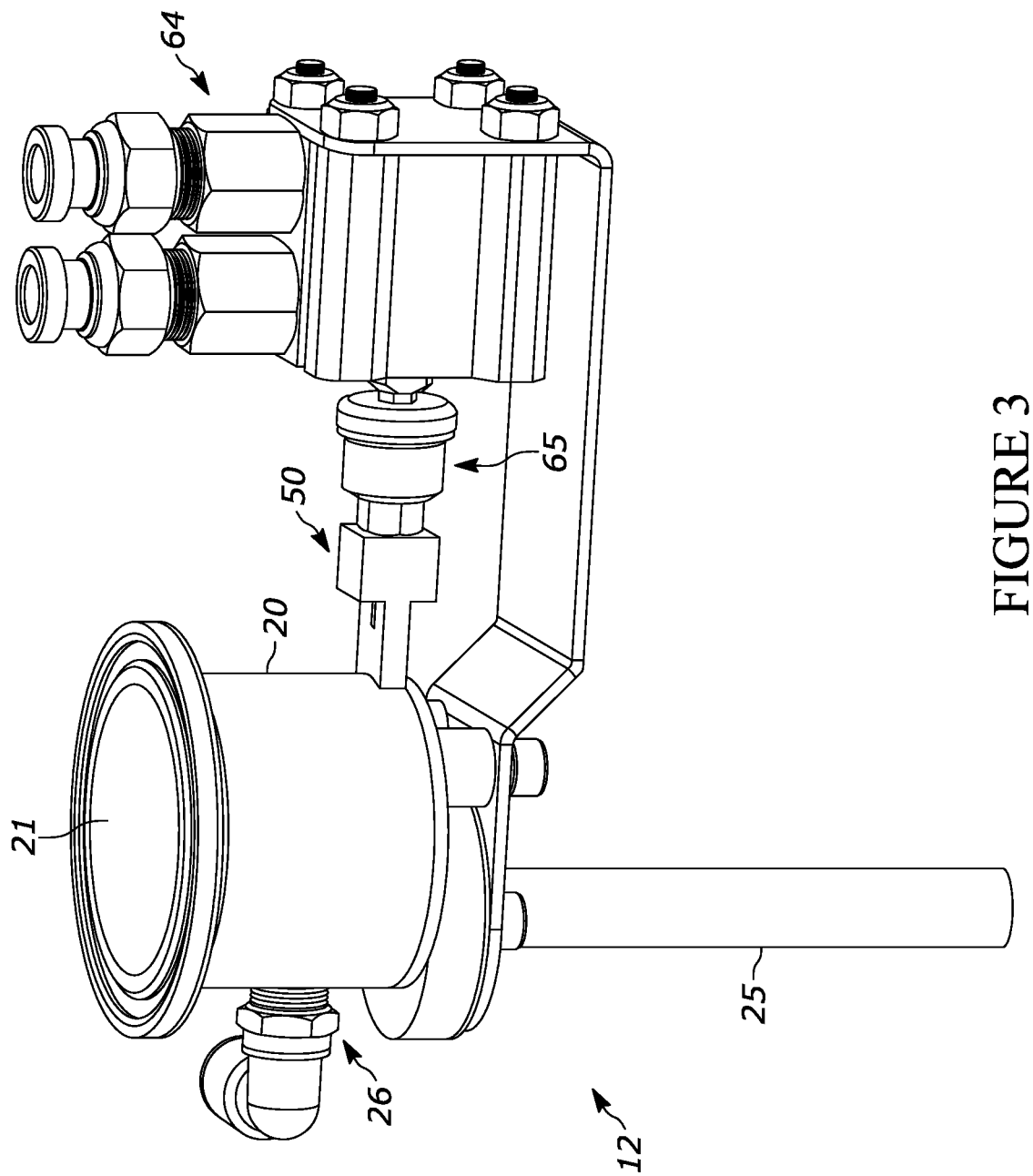
FIG. 3 of the drawings is a perspective view of the valve assembly of the dosing assembly of the present disclosure.
Figure 4:
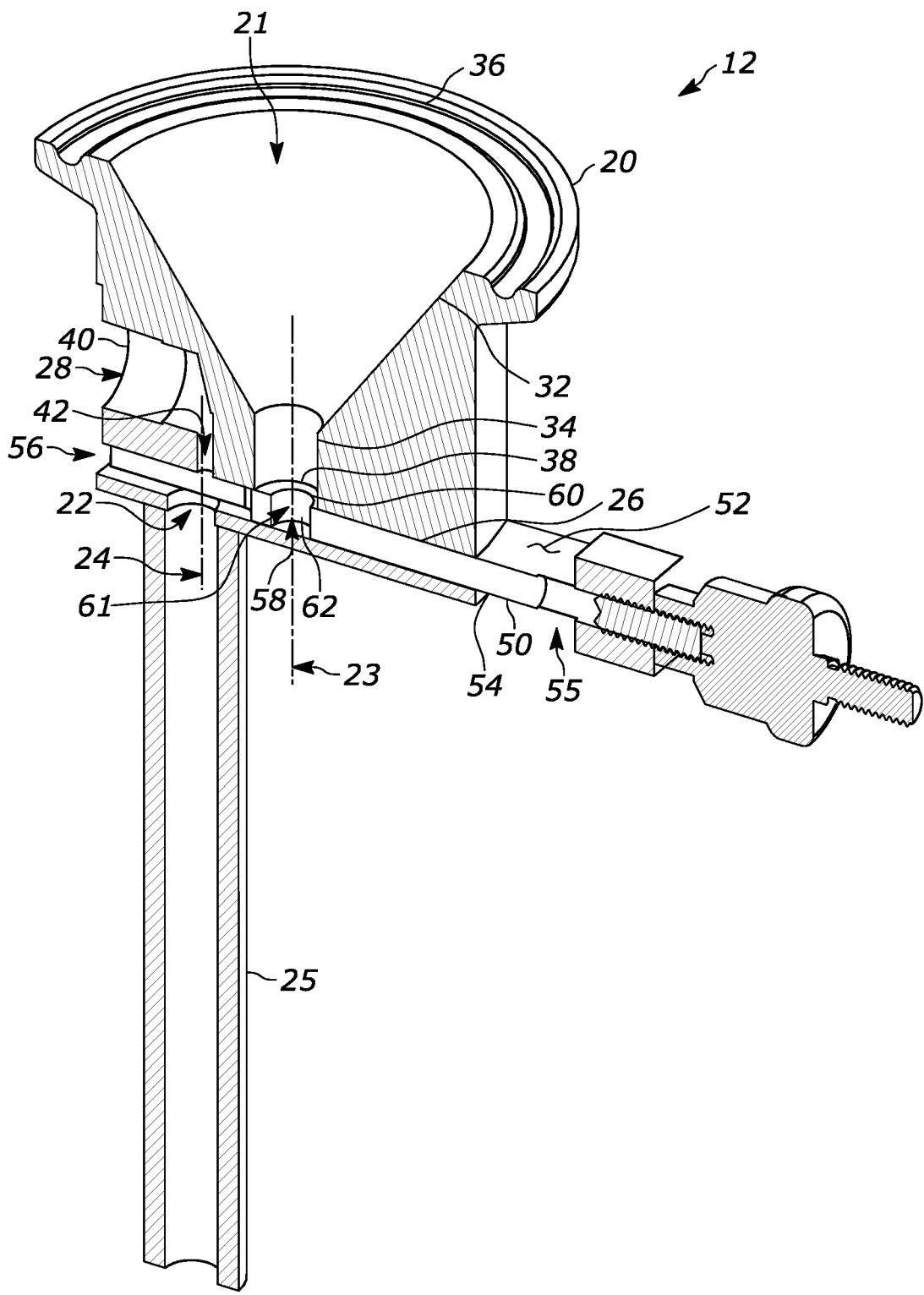
FIG. 4 of the drawings is a cross-sectional view of the valve assembly of the dosing assembly of the present disclosure.
Figure 5:
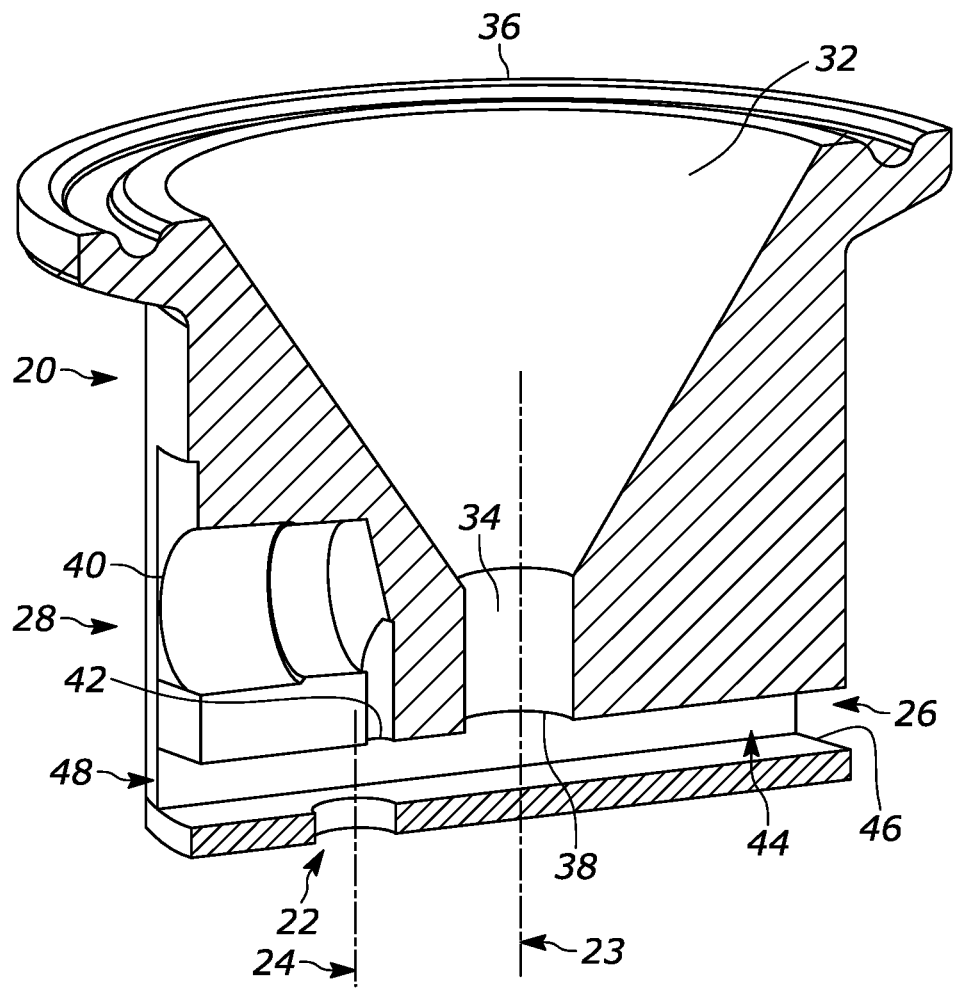
FIG. 5 of the drawings is a cross-sectional view of the valve body of the dosing assembly of the present disclosure.
Figure 6:
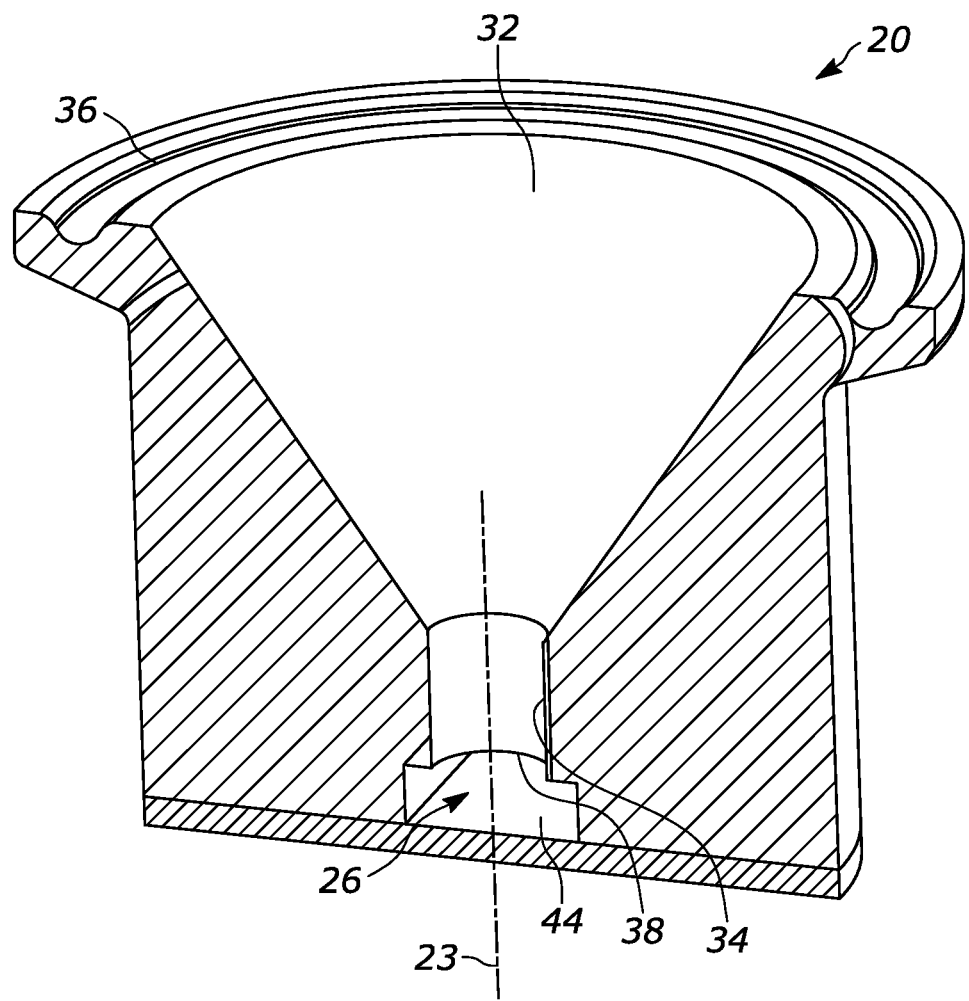
FIG. 6 of the drawings is a cross-sectional view of the valve body of the dosing assembly of the present disclosure, showing, in particular, the inlet of the valve body.
Figure 7:
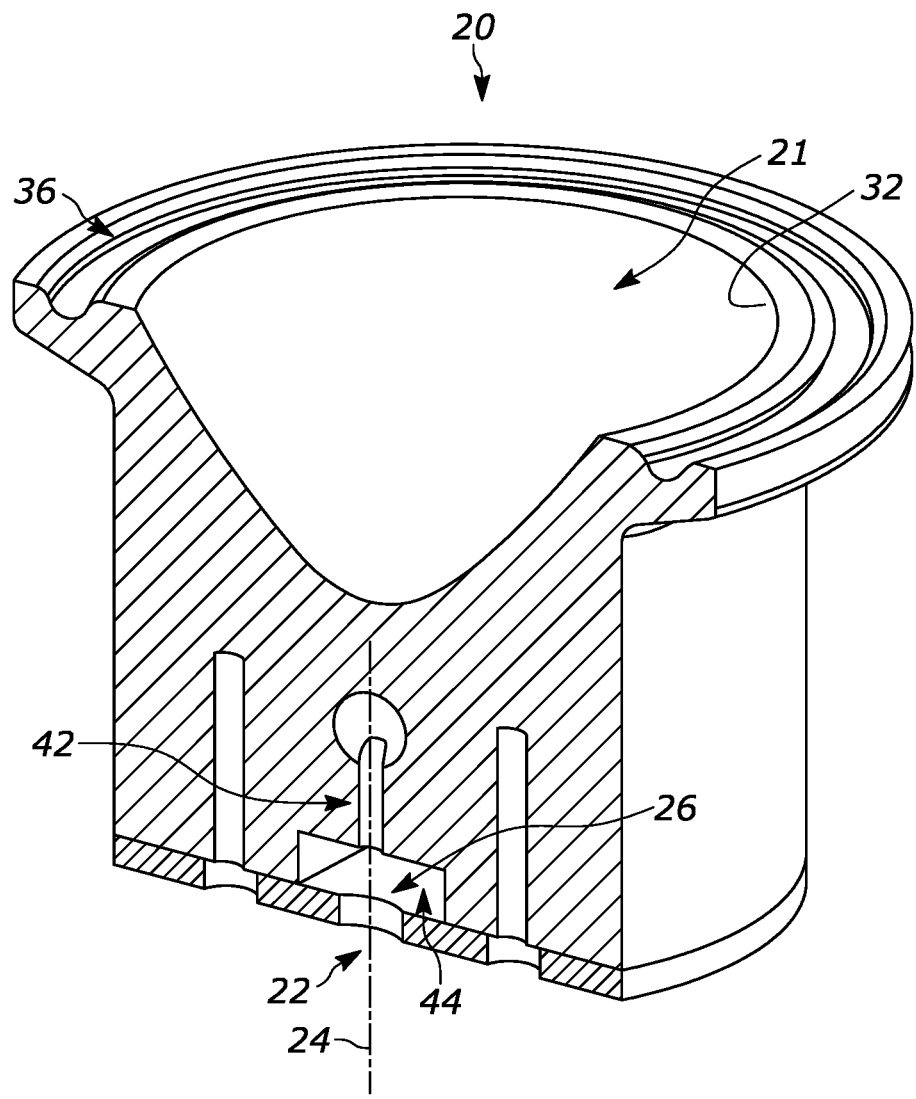
FIG. 7 of the drawings is a cross-sectional view of the valve body of the dosing assembly of the present disclosure, showing, in particular, the outlet of the valve body.

The valve assembly 12 is shown in FIGS. 3 and 4 as comprising valve body 20, valve slider plate 50 and valve actuator 64. It will be understood that the valve body is structurally configured to provide a repeatable dose to open containers (as the filling process for those containers is proceeding). The valve body 20 includes inlet 21, outlet 22, pneumatic passage 28 and transverse slot 26. With additional reference to FIGS. 5 and 6, the inlet 21, in the configuration shown defines a funnel having conical portion 32 and cylindrical portion 34 that define the upper opening 36 and the lower dispensing opening 38. It will be understood that different shapes are contemplated for the inlet, and in some configurations, there may be a smaller volume, with the funnel omitted or being separately coupled to the valve body. In the configuration shown, the valve body can maintain a volume of the fill material within the funnel, and the funnel or other structure may be sized to a number of different sizes.

Similarly, the lower dispensing opening can be appropriately sized so as to provide the necessary amount of material at a desired flow rate. That is, the size and shape of the lower dispensing opening can be altered depending on a number of factors. In the configuration shown, the lower dispensing opening is shown as comprising a generally uniformly circular opening, while others are contemplated. It will be understood that the inlet 21 is generally configured to allow for gravity dispensing, and defines a generally vertical axis of dispensing (that is, once material leaves, the material will generally fall due to gravity along a generally vertical axis defined by gravitational forces, which is shown as axis 23). As set forth below, the region can be encapsulated and can be filled with a gas (i.e., an inert gas, a sterilized gas, or another gas) to preclude contamination and the introduction of gasses.

The outlet 22 is shown in FIGS. 3, 4, 5 and 7, as comprising elongated dispensing tube 25, which is generally oriented in the vertical direction (i.e., the direction of gravity) and defines an axis 24. It will be understood that both the inlet and the outlet can be configured to be inclined or otherwise something other than vertical or in line with gravitational forces, however, the axes that are identified are generally the axis that are in the direction of gravitational forces.

It will be understood that the inlet and the outlet are offset, in the transverse direction, such that the axis 23 and the axis 24 are spaced apart from each other, while being generally aligned in a longitudinal direction (that is in the direction of the transverse slot), that is, sufficiently aligned so that a passage can be made in the valve slider plate to place the passage selectively in communication with each. In the configuration shown, both of the axes are substantially vertical and spaced apart from each other in a parallel configuration.

The transverse slot 26 is defined within the valve body 20 and defines a substantially uniform cross-sectional configuration 44 between inlet 21 and the outlet 22. The transverse slot 26 extends from first end 46 to second end 48. Both the inlet 21 and the outlet 22 are in fluid communication with the transverse slot. The transverse slot, in the configuration shown, is perpendicular to the axis 23 and the axis 24, and generally perpendicular to the force of gravity. However, it is contemplated that the transverse slot may be oblique to one or both of the axis 23 and 24, and that that the transverse slot may be other than substantially horizontal.

The pneumatic passage 28 includes a first end 40 providing ingress into the valve body, and second end 42 in fluid communication with the slot, generally opposite of the outlet 22. In the configuration shown, the second end 41 of the pneumatic passage lies in the same axis (at least partially) as the outlet 22. It will be understood that pneumatic forces can push/direct fill material through the outlet 22 and through the elongated dispensing tube, where desirable.

Figure 8:
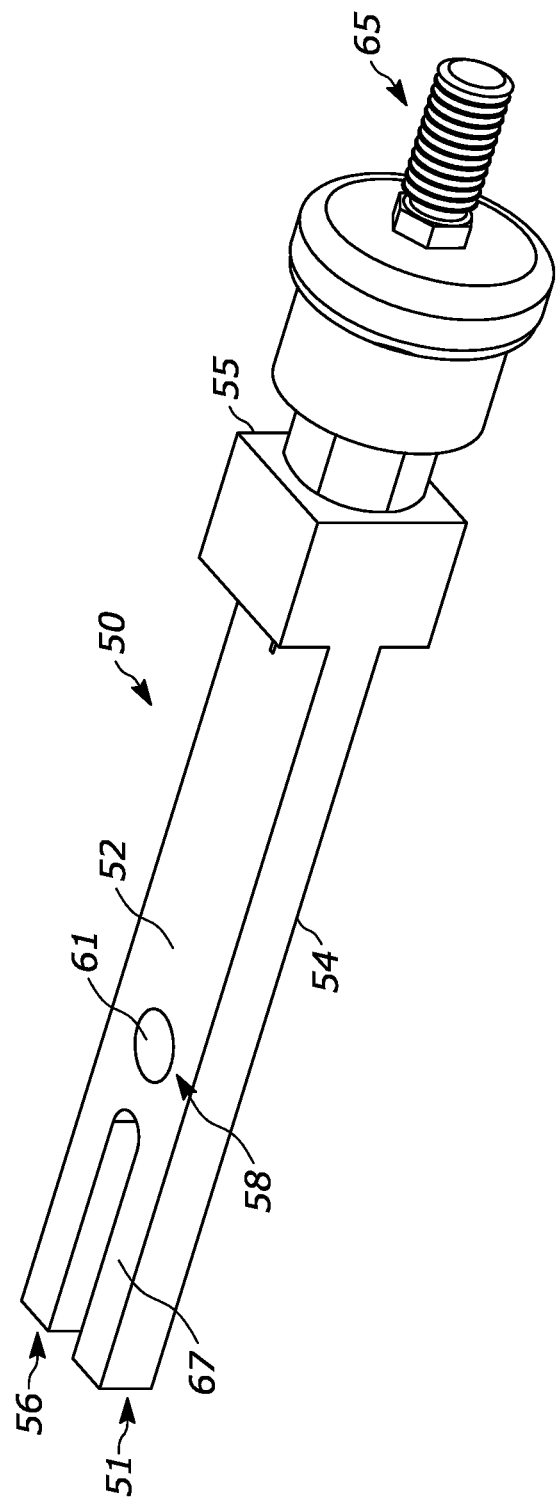
FIG. 8 of the drawings is a perspective view of the valve slider plate, along with the output shaft of the valve actuator.
Figure 9:
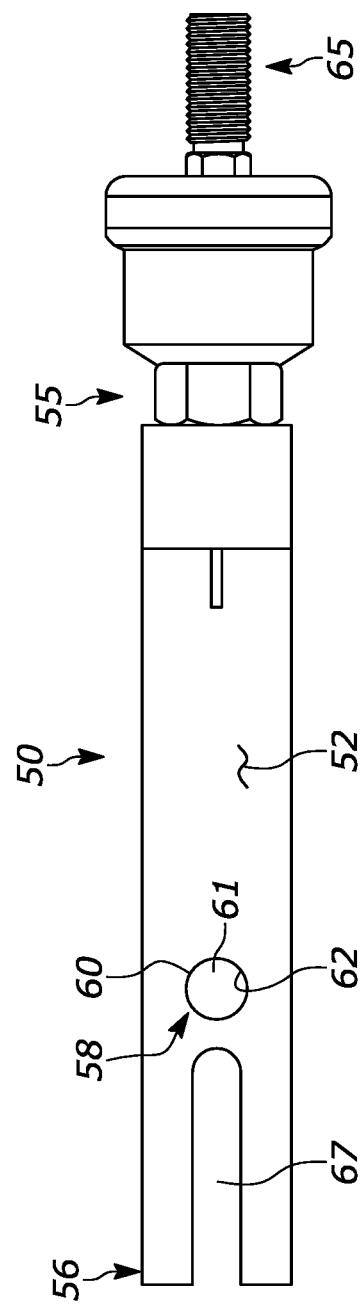
FIG. 9 of the drawings is a top plan view of the valve slider plate, along with the output shaft of the valve actuator.

The valve slider plate 50 is shown in FIGS. 4, 8 and 9 as comprising an elongated plate having a cross-sectional configuration 51, and including top surface 52 and bottom surface 54. The valve slider plate extends between proximal end 55 and distal end 56. In the configuration shown, the valve slider plate comprises an elongated rectangular cubic configuration that is substantially uniform and that substantially matches in cross-sectional configuration with the transverse slot 26 of the valve body. In the configuration shown, the height of the valve slider plate is dimensionally the smallest, with the length being the largest, and the width being between the height and length. Variations are certainly contemplated wherein each of the dimensions can be varied.

The valve slider plate 50 further includes transfer dose cavity 58 defining a volume 61 that includes an entry opening 60 proximate the top surface 52 and exit opening 62 proximate the bottom surface 54. The entry opening 60 can be placed in communication with the lower dispensing opening of inlet 21 of the valve body 20 when in a first slidable position within the transverse slot. The exit opening can be placed in communication with the outlet 22 of the valve body when in a second slidable position within the transverse slot that is different than the first slidable position. It will be understood that the first slidable position and the second slidable position may comprise a range of positions, but that the first and the second slidable positions do not overlap. In that manner, the transfer dose cavity is preferably in communication with only one of the inlet and the outlet.

Additionally, the transfer dose cavity can be in simultaneous communication with the outlet 22 and the second end 42 of the pneumatic passage. As such, pneumatic forces can be directed through the second end 42 of the pneumatic passage and through the transfer dose cavity 58 and the outlet 22, to, in turn, push fill material through the outlet 22. It will be understood that the transfer dose cavity may include an elongated slot 67 that remains or is in fluid communication with each of the outlet 22 and the second end 42 of the pneumatic passage so that the pneumatic passage can be in communication with the outlet when the transfer dose device is in the first position (so as to keep the passageway clear and ready to receive additional doses).

It will be understood that the volume 61 can be varied in a number of different manners, including, but not limited to the cross-sectional configuration of the cavity between the top and bottom surfaces, as well as the thickness of the valve slider plate. It will be understood that the performance can be varied by altering various dimensions of the cavity.

It will further be understood that in the configuration shown, there is a one to one relationship between the inlet and the outlet. It is contemplated that a plurality of inlets may be directed to a single outlet, or a plurality of inlets may be directed to a plurality of outlets, or that a single inlet may be directed to a plurality of outlets. These variations are contemplated. The inlets and outlets may be arranged sequentially or may be arranged in a simultaneous fashion, or in a combination of each.

The valve actuator 64 is shown in FIG. 3 as having an output shaft that coupled to the valve slider plate 50. The output shaft can be translated between a first position (wherein the transfer dose cavity 58 is in communication with the inlet 21 of the valve body) and a second position (wherein the transfer dose cavity 58 is in communication with the outlet 22 of the valve body). In the configuration shown, the valve actuator comprises a pneumatic cylinder, however other variations are contemplated, including, but not limited to servos, lever actuators, continuously running motors, and the like, with the understanding that the valve actuator directs the valve slider plate between the first and second positions. In the configuration shown, the actuator can be directed in a first direction through one pneumatic force and in a second direction through a second pneumatic force.

In the configuration shown, and with reference to FIGS. 1 and 2, the valve body 20 is coupled to a product hopper 14 that can store additional fill material. The product hopper is shown as defining cavity 72 having mating outlet 70 and pneumatic supply opening 73. The cavity 72 may comprise one or more frustoconical members 74 (to preferably provide a generally conical and funnel-like configuration that directs fill material to the mating outlet). The multiple frustoconical members may be coupled to each other through the use of sanitary clamps (known to those of skill in the art) equipped with gaskets between the different components. A lid may seal the uppermost of the frustoconical members. The pneumatic supply opening 73 may extend through the lid, and is configured to provide pressure to the cavity 72. In some configurations, it is contemplated that an inert gas may be provided through the pneumatic supply opening so as to direct the fill material toward the mating outlet and also to preclude the ingress of moisture and/or contaminants. In other configurations, this may be omitted. It is contemplated that additional frustoconical members can be periodically removed and attached to provide a substantially continuous supply of fill material. It is further contemplated that the product hopper can be modified so as to hold a greater or lesser amount of the fill material.

The containment system 16 is shown in FIGS. 1 and 2 as extending and surrounding the valve assembly 12. In the configuration shown, the containment system 16 includes lower housing 80 and upper cover 82, which are secured together through sanitary clamp 84 (with gasket 85 therebetween). The lower housing 80 includes dispensing tube outlet 86 and upper rim 88. The cover includes sealing rim 90 and pneumatic opening 92. When in the operable configuration, the elongated dispensing tube 25 extends through the dispensing tube outlet and the product hopper extends through the cover (or may be formed with the cover). It will be understood that the containment system defines cavity 89 which can be maintained (by air or other gasses being directed through the pneumatic opening. A number of fittings maybe presented on the lower housing or the cover to allow for the coupling of, for example, the valve actuator to pneumatic sources. The positive pressure within the cavity 89 limits accumulation of moisture and/or contaminants within the valve assembly.

In operation, the dosing assembly is positioned in an operable position relative to the filler. In one configuration, the dosing assembly can be positioned after the containers (in the configuration shown, commonly known metal cans) are filled with a fluid, such as a carbonated or non-carbonated beverage, including, water, juices, soft drinks, beer, spiked seltzers, mixers, liquor, etc., as well as with other materials, such as, for example, above a conveyor that carries containers positioned thereon beyond the dosing assembly. There is no particular limitation that the assembly be used with beverages, and other uses are contemplated, such as, for example, with other fluids, suspensions, flowable materials, gels, and materials (i.e., paint, gels, flavorings, etc.). The particular material within which the container is filled is not limited to any particular fill. In other configurations, the containers may be empty and either filled later, or only filled with such information.

Once positioned, the desired fill material can be introduced into the product hopper. Due to gravity (and pneumatic forces, where utilized), the fill material is directed into the funnel of the inlet 21 of the valve body. Initially, the valve slider plate is in a first position so that the transfer dose cavity is aligned with the inlet 21. As such, the fill material is directed through the inlet 21 and into the volume 61 of the transfer dose cavity. It will be understood that the volume 61 defines the dose of the dosing assembly (and that varying the size of the cavity will vary the dose delivered by the dosing assembly).

The valve actuator is activated to direct the valve slider plate 50 from the first position toward and to the second position. As the valve slider plate traverses through the transverse slot 26 of the valve body, the transfer dose cavity 58 is slid past the inlet 21 so that the inlet 21 abuts the top surface 52 of the valve slider plate. Once the plate moves sufficiently, the top surface 52 seals the inlet 21 and fill material is precluded form passing therethrough in any meaningful amount.

As the valve slider plate 50 continues to traverse through the transverse slot 26, eventually, the volume 61 of the transfer dose cavity is placed in fluid communication with the outlet 22 (and, in turn, the elongated dispensing tube 25). Due to gravity, the fill material exits from the transfer dose cavity and into the dispensing tube 25. A pneumatic force can be directed through second end 42 of the pneumatic passage 28 to assist the exiting of the fill material from the transfer dose cavity, and/or, to speed up the delivery of the fill material out of the elongated dispensing tube.

It will be understood that a container is positioned below the elongated dispensing tube so that the fill material exits the elongated dispensing tube and is directed into the container and captured thereby. It will be understood that the container may be traversing across a path and that the container may only be positioned below the elongated dispensing tube for a predetermined period of time. Thus, the release of the fill material from within the transfer dose cavity can be timed so as to occur when the container is properly positioned below the elongated dispensing tube.

Once the fill material has exited to a desired amount (preferably entirely), the valve actuator 64 directs the valve slider plate from the second position back to the first position. As the valve slider plate returns to the first position, eventually, the transfer dose cavity is in communication with the inlet 21 of the valve body. Fill material is again directed into the volume of the transfer dose cavity. The process can then be repeated as often as desired to dispense the does that is in the transfer dose cavity into a container. It will be understood that through timing, the valve actuator can be cycled repeatedly to provide a dose to sequential containers that are passing below the elongated dispensing outlet, along, for example, the conveyor shown in FIG. 1. For example, the containers can be positioned sequentially along a conveyor, with the slidable movement between the first position and second position timed so that the cycle is repeated for each can positioned therebelow.

It is contemplated that, in a kit form, a number of different valve slider plates can be provided so as to provide a different volume. It will further be understood that in other configurations, the stroke of the valve actuator may be changed to provide a different dispensing pattern or the like. As indicated, a number of inlets and outlets may be provided, as well as a number of different transfer dose cavities on the valve slider plate. It is further contemplated that a number of dosing assemblies can be utilized and associated with a single filler.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A valve assembly for a dosing assembly comprising:
   a valve body having an inlet and an outlet, and a transverse slot in communication with the inlet and the outlet;
   a valve slider plate positionable in the transverse slot, and having a transfer dose cavity, the transfer dose cavity placeable in communication with the inlet and the outlet of the valve body, upon selective slidable movement of the valve slider plate, wherein the slider plate is structurally configured to move between a first slidable position and a second slidable position, wherein in the first slidable position, the transfer dose cavity is in communication with the inlet of the valve body, and wherein in the second position, the transfer dose cavity is in communication with the outlet of the valve body; and a pneumatic passage in fluid communication with the transfer dose cavity when the transfer dose cavity is in the second position, wherein the slider plate further includes a second opening, the second opening being in fluid communication with the pneumatic passage and the outlet when the transfer dose cavity is in the first position.

2. The valve assembly of claim 1 wherein the second opening comprises an elongated slot.

3. The valve assembly of claim 1 wherein the inlet defines an inlet axis and the outlet defines an outlet axis, with the inlet axis and the outlet axis being substantially parallel to each other, and with the valve slider plate movable between the first position and the second position along a path substantially perpendicular to each of the inlet axis and the outlet axis.

4. The valve assembly of claim 1 further comprising an actuator attachable to the valve slider plate, structurally configured to move the slider plate between a first slidable position and a second slidable position.

5. The valve assembly of claim 1 wherein the inlet further comprises a funnel defining a substantially conical portion.

6. The valve assembly of claim 1 wherein the length of the outlet includes an elongated dispensing tube that has a length that is multiples of a thickness of the valve slider plate.

7. The valve assembly of claim 1 wherein the inlet, the outlet and the transfer dose cavity each define a cross-sectional configuration, with the cross-sectional configuration of each substantially matching.

8. The valve assembly of claim 1 wherein the valve slider plate has a substantially rectangular configuration, substantially matching the transverse slot.

9. A dosing assembly for use with a filler, the dosing assembly comprising:
a valve assembly of claim 1;
a product hopper having a cavity placeable into fluid communication with the inlet of the valve assembly.

10. The dosing assembly of claim 9 wherein the product hopper further includes at least one frustoconical member extending from the inlet, each of the at least one frustoconical members being attachable in an end to end configuration.

11. The dosing assembly of claim 9 wherein the product hopper further includes a pneumatic supply opening structurally configured to provide a pneumatic supply to the cavity of the product hopper.

12. The dosing assembly of claim 9 further comprising a containment system defining a containment cavity, with the valve assembly positionable therein.

13. The dosing assembly of claim 12 wherein the containment system further includes a pneumatic opening structurally configured to provide a pneumatic supply to the containment cavity.

14. A filler comprising:
dosing assembly comprising:
a valve assembly of claim 1;
a product hopper having a cavity placeable into fluid communication with the inlet of the valve assembly;
a conveyor operably configured to carry a container thereon positioned to traverse an opening of the container below the outlet of the valve assembly.

* * * * *